United States Patent [19]

Petruchik

[11] Patent Number: 5,530,502
[45] Date of Patent: Jun. 25, 1996

[54] CAMERA AUTOWIND GEAR MECHANISM

[75] Inventor: Dwight J. Petruchik, Honeoye Falls, N.Y.

[73] Assignee: Eastman Kodak Company, Rochester, N.Y.

[21] Appl. No.: 403,159

[22] Filed: Mar. 13, 1995

[51] Int. Cl.⁶ ..................................................... G03B 1/18
[52] U.S. Cl. ....................................... 354/173.1; 354/214
[58] Field of Search ........................... 354/173.1, 173.11, 354/214

[56] References Cited

U.S. PATENT DOCUMENTS

| | | | |
|---|---|---|---|
| 3,736,015 | 5/1973 | Dierks et al. | 242/71.2 |
| 4,322,149 | 3/1982 | Maida | 354/173 |
| 5,091,740 | 2/1992 | Hori . | |
| 5,307,102 | 4/1994 | Ohara . | |

FOREIGN PATENT DOCUMENTS 63-58236  4/1988  Japan ................................ G03C 3/00

*Primary Examiner*—Monroe H. Hayes
*Attorney, Agent, or Firm*—Peter J. Bilinski

[57] ABSTRACT

An autowind gear mechanism in a camera housing includes a harmonic gear reducer having a ring gear that walks a planet gear around a stationary sun gear to thereby move a film spool coupled to the planet gear and move a photographic film roll attached to the film spool. The ring gear has a circular outer circumference and an offset inner bore. The planet gear sits within the inner bore of the ring gear. The outer circumference of the ring gear is couple to a film drive motor, which causes rotation of the ring gear, thereby driving the planet gear, which then walks around the sun gear in an eccentric motion.

31 Claims, 3 Drawing Sheets

CAMERA AUTOWIND GEAR MECHANISM

BACKGROUND OF THE INVENTION

1. Field of the Invention

This invention relates generally to photographic cameras and, more particularly, to automatic, powered film winding mechanisms in cameras.

2. Description of the Related Art

Many photographic cameras include self-powered film winding mechanisms that automatically move a strip of photographic film within the camera before each exposure is produced. Typically, a small electric motor powers a gear train that is coupled to a film spool. One end of the film strip is attached to the spool so that operating the motor causes the gear train to rotate the spool, which moves the film. The motor is operated for a sufficient time before each exposure to ensure that a fresh, unexposed frame of film is at an exposure gate and any previously exposed frame is moved away. Typically, the motor is coupled to a shutter mechanism so that moving the film also cocks a shutter for making an exposure. Such automatic film winding, also referred to as an "autowind" feature, makes the camera easier to use and has become quite popular.

Another popular consumer item is the single-use camera, comprising an inexpensive housing that contains a length of photographic film and picture-taking components such as a viewfinder, an objective lens, a shutter mechanism, and a film transport mechanism. After a consumer purchases the film-containing single-use camera and exposes the entire length of film, the consumer provides the camera to a film processor for film development and printing. The film processor extracts the film, develops it, and provides the consumer with the processed film and prints. In this way, the single-use camera is very convenient. The consumer does not re-use the camera, hence the term single-use camera. Instead, the film processor returns the housing and camera components to the manufacturer for refurbishing. The refurbished camera, with a new load of photographic film, is then sold once again to a consumer. A design goal for a single-use camera with an autowind feature is to incorporate all film drive components within the camera housing at minimal expense. Therefore, the motor used to move the photographic film is relatively small and inexpensive. A gear train with a high reduction ratio is typically required because the motor output shaft is small and such a motor usually produces relatively low torque output. The high gear reduction ratio also is required so that the motor torque can be carefully and precisely applied. Torque must be very carefully applied in the film exposure direction because the film must be moved very precisely to maintain frame-to-frame spacing. Application of torque is not so critical in the film rewind direction.

Although the gear reduction must be achieved in a limited amount of space, the high gear reduction ratio can require a relatively large number of gear components. The gear reduction often is achieved through a gear train that includes seven or more spur gears.

In U.S. Pat. No. 4,322,149 to Maida et al., for example, a motor powers a gear mechanism comprising up to ten gears for forward film movement. The Maida system includes a motor that drives an axially slidable gear. The gear meshes with one gear to move film forward in a wind-up direction and meshes with a different gear to rewind the film. In the forward film direction, the motor drives a series of spur gears that in turn drives a planetary gear arrangement that rotates a film coupling. The film coupling can be connected, for example, to a film take-up spool.

In a single-use camera, film is moved only in one direction. Typically, the film is wound back into the cartridge as exposures are made. A consumer who purchases a single-use camera, therefore, does not have to rewind the film for removal from the camera, as this action is performed by a photofinisher. As noted above, however, the application of torque that must be most precisely controlled and that particularly requires high gear reduction is in moving the film in the exposure direction. Thus, single-use cameras with an autowind system typically have reduction gear trains with many components, such as described above.

In a conventional autowind system for a single-use camera, the large number of gears necessary to achieve the required gear reduction ratio adds to the cost of the autowind system and increases the amount of space necessary to contain the gear mechanism. Any increase in the size of the single-use camera housing necessary to contain the autowind gear mechanism adds to the cost and reduces the user convenience of the camera. The large number of spur gears in the autowind mechanism also makes camera assembly more difficult.

From the discussion above, it should be apparent that there is a need for a photographic camera with an automatic film winding mechanism that can be provided with a minimal number of components in a small space and that can be produced at reduced cost. The present invention fulfills this need.

SUMMARY OF THE INVENTION

The present invention provides an autowind gear mechanism comprising a harmonic gear reducer in which a film drive motor rotates an eccentric ring gear that walks an inner planet gear around a stationary sun gear to thereby move a film spool coupled to the inner planet gear and move a photographic film roll attached to the film spool. In this way, the autowind gear mechanism provides an autowind feature with a minimal number of gear train components in a small space. The harmonic gear reducer comprises an eccentric interface gear, a planet gear, and a sun gear that provide the needed gear reduction for use with small motors with fewer gears that take up less space than conventional gear mechanisms.

In one aspect of the invention, an autowind gear mechanism in a camera housing includes an interface gear that is in meshing engagement with a cluster gear driven by a film drive motor such that operation of the film drive motor causes the cluster gear to rotate about a rotational axis and drive the interface gear. Rotation of the interface gear causes rotation of a planet gear, which is thereby walked around a stationary sun gear in an eccentric motion. The planet gear is directly coupled to a film spool. Thus, the gear train between the film drive motor and the film spool is comprised of only three gears, the sun gear, planet gear, and interface gear, only two of which rotate to drive the film spool.

Other features and advantages of the present invention should be apparent from the following description of the preferred embodiment, which illustrates, by way of example, the principles of the invention.

DESCRIPTION OF THE PREFERRED EMBODIMENT

Figure 1:
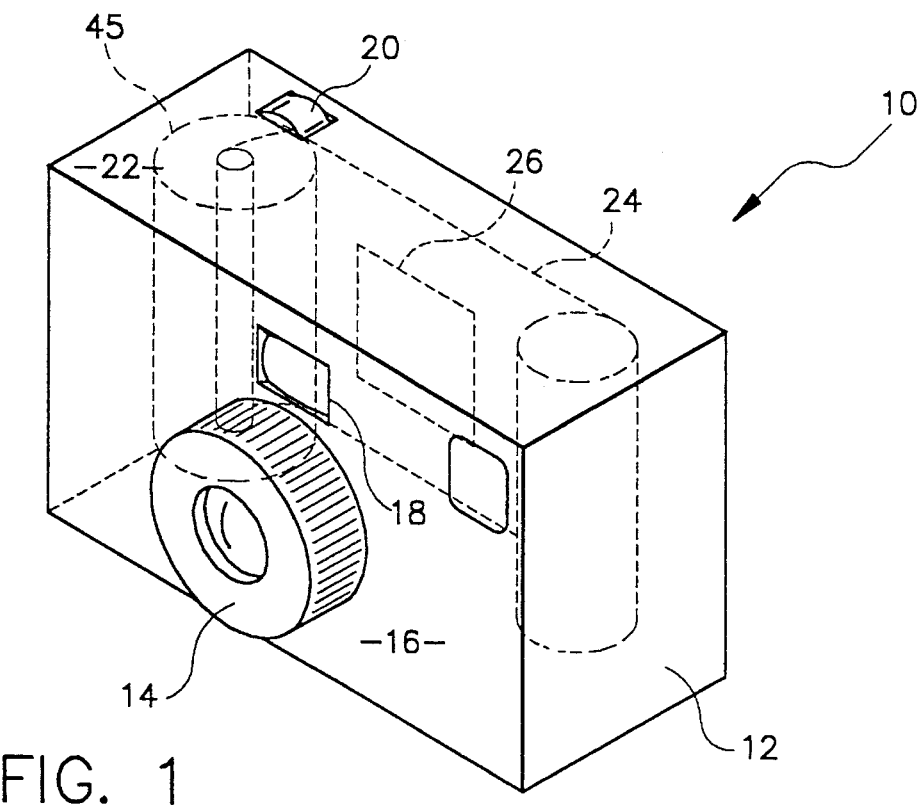
FIG. 1 is a perspective phantom view of a single-use camera with an autowind gear mechanism constructed in accordance with the present invention, illustrating the location of a roll of photographic film inside the camera.
Figure 2:
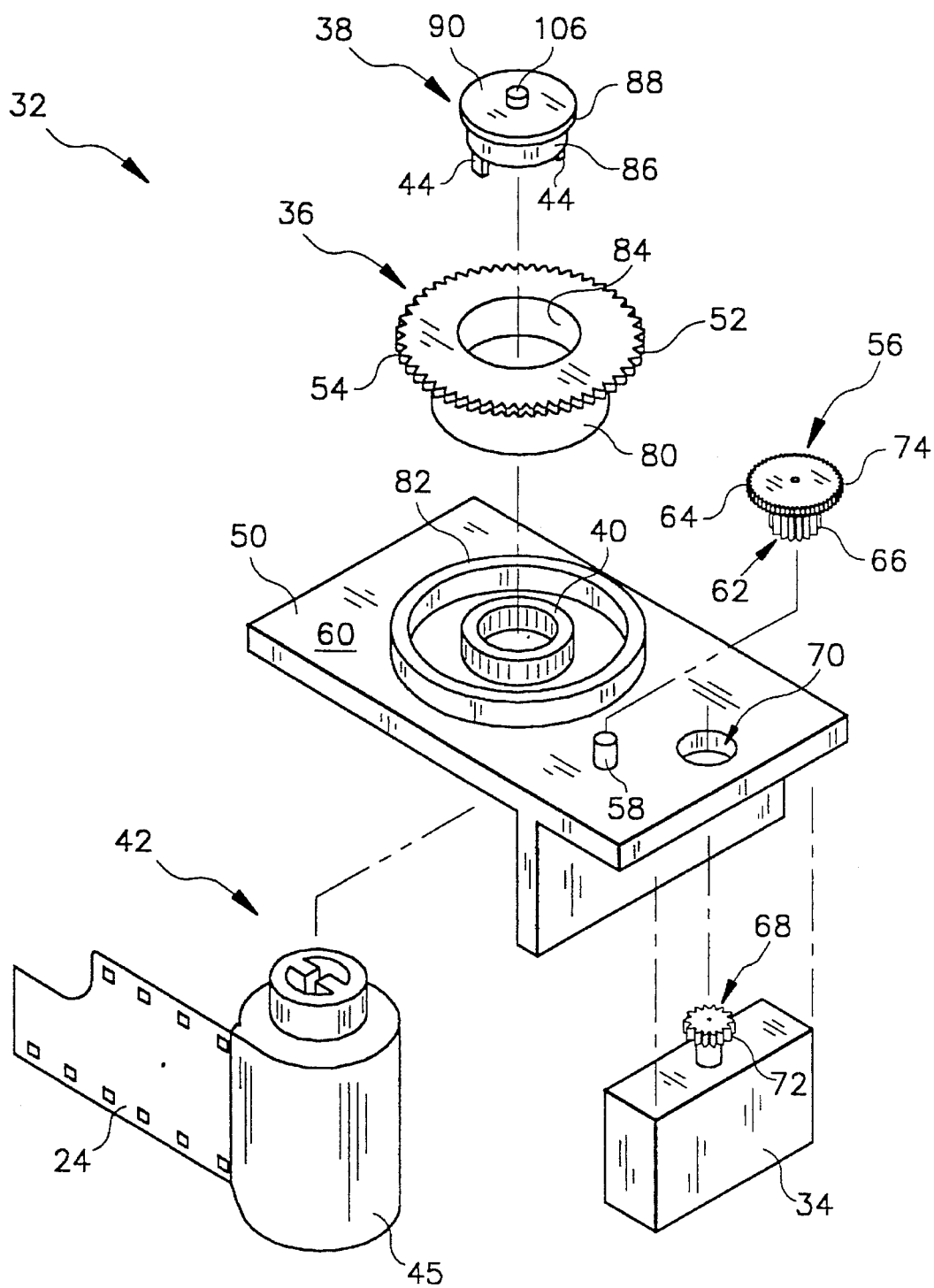
FIG. 2 is an exploded perspective view of the autowind gear mechanism contained in the camera illustrated in FIG. 1.

FIG. 1 shows a single-use camera 10 having a film winding mechanism constructed in accordance with the present invention. The camera includes an outer housing/ body 12, an objective lens 14 at a front surface 16 of the camera body, a viewfinder 18, and a shutter button 20 on a top surface 22 of the camera body. A camera user views a photographic scene through the viewfinder 18 and exposes one frame of photographic film by pressing the shutter button 20. A roll of photographic film 24 is shown in phantom to illustrate the relative location of the film within the camera 10. When the shutter button 20 is pressed, a shutter mechanism (not illustrated) opens momentarily and directs light from the objective lens 14 onto the film 24 at an exposure gate 26. FIG. 2 shows an autowind film winding gear mechanism 30 that is contained within the camera body 12. The autowind mechanism includes a harmonic gear reducer 32 that is driven by a small film drive motor 34 and is coupled to the film roll 24 to move the film in the camera 10. The harmonic gear reducer includes a ring gear 36, a planet gear 38, and a sun gear 40.

When a camera user presses the shutter button 20 (FIG. 1), the film drive motor 34 responds by rotating the ring gear 36, which causes the planet gear 38 to move in an eccentric motion. That is, the ring gear "walks" the planet gear around the outer circumference of the stationary sun gear 40. The planet gear is coupled to a keyed film spool 42 by drive tangs 44. The drive tangs fit into one end of the film spool so that the tangs engage the keyed film spool and rotate the film spool in the same direction and at the same speed as the planet gear. The film spool is typically carried within a film cartridge 45. Thus, the harmonic gear mechanism 32 provides a simple, compact gear train that rotates the film spool and moves the film in the camera 10.

More particularly, FIG. 2 shows that the stationary sun gear 40 comprises a raised wall projecting upwardly from a gear plate 50, which is attached to the camera body 12 (FIG. 1). As described in greater detail below, the ring gear 36 and the planet gear 38 rotate in the same direction so that the outer circumference of the ring gear defines a circle of rotation but the planet gear is walked around the sun gear 40 by rotation of the ring gear 36. The ring gear includes an outwardly extending upper flange 52 having a circular, toothed outer circumference. Teeth 54 on the outer circumference of the ring gear upper flange engage a cluster gear 56 that rotates about a rotation pin 58 that extends upwardly from a top surface 60 of the gear plate 50. In this way, the cluster gear drives the ring gear.

The cluster gear 56 has a lower cylindrical drive shaft 62 and an outwardly extending upper flange 64 having a circular outer circumference with a diameter greater than the diameter of the drive shaft. Teeth 66 on the cluster gear drive shaft engage the upper flange teeth 54 of the ring gear 36. The film drive motor 34 is attached to the underside of the gear plate 50 and includes an output pinion drive gear 68 that extends through an opening 70 in the gear plate. Teeth 72 on the motor output pinion drive gear engage teeth 74 on the cluster gear upper flange. Thus, rotation of the pinion drive gear in one direction rotates the cluster gear 56 in the opposite direction, which rotates the ring gear in the same direction as the pinion drive gear. The ring gear, in turn, walks the planet gear 38 around the sun gear 40 in the pinion drive gear direction. The linkage of torque from the output of the motor to rotation of the planet gear will be described in greater detail.

The ring gear 36 has a lower face 80 having a diameter slightly smaller than the base circle diameter of the ring gear upper flange 52. The lower face has a substantially smooth surface that is sized to fit within a diameter defined by a circular guide rib 82 comprising a raised wall that extends upwardly from the top surface 60 of the gear plate 50, so that the guide rib locates the ring gear on the gear plate. Thus, the ring gear 36 is contained within the guide rib 82 as the ring gear is driven by the cluster gear 56. The ring gear also has a substantially smooth inner surface 84, which defines an eccentric central bore of the ring gear. That is, the ring gear central bore is a circle whose center is offset from the geometric center of the ring gear lower face 80 and therefore is offset from the ring gear axis of rotation. Circular rotation of the ring gear thereby causes the ring gear central bore to revolve in an eccentric motion.

The eccentric motion of the ring gear central bore causes the ring gear inner surface 84 to push against the planet gear 38. FIG. 2 shows that the planet gear includes a generally smooth, circular outer face 86 and an outwardly extending upper flange 88 with a top cap surface 90. The diameter of the planet gear outer face is slightly less than the diameter of the ring gear central bore. Therefore, the pushing of the ring gear inner surface against the planet gear outer face travels around the circumference of the respective gears and drives the planet gear in an eccentric motion. As will be described further below, an inner wall of the planet gear (not visible in FIG. 2) makes contact with the stationary sun gear 40 of the gear plate 50 so that the planet gear walks around the sun gear.

Figure 3:
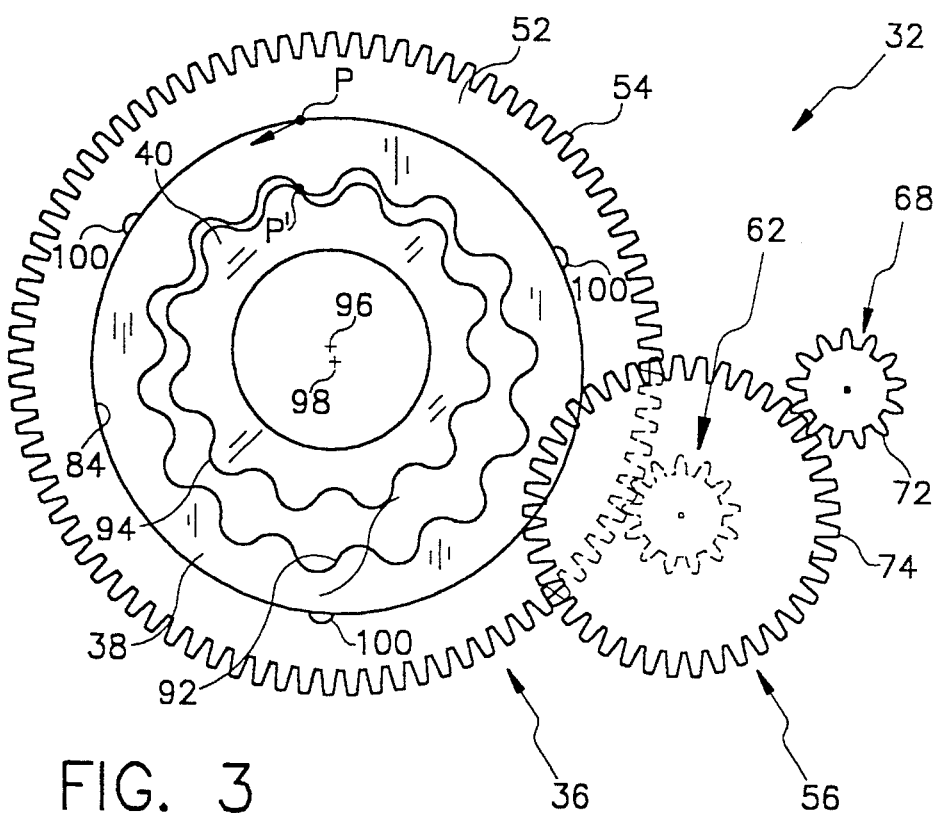
FIG. 3 is a detail plan view of the gears illustrated in FIG. 2 showing their relative position in the camera.

FIG. 3 illustrates the pushing of the ring gear 36 against the planet gear 38 and also the walking contact of the planet gear with the sun gear 40. FIG. 3 is a simplified representation of the harmonic gear reducer 32 intended to show the engagement of the various gears. FIG. 3 indicates that the motor output pinion drive gear 68 has thirteen teeth 72 and the cluster gear upper flange 64 has forty-one teeth 74, thereby providing some gear reduction effect. FIG. 3 also indicates that the cluster gear drive shaft 62 has thirteen teeth 66 and the ring gear upper flange 52 has eighty-five teeth 54, thereby providing additional gear reduction.

FIG. 3 shows that the pushing of the ring gear 36 against the planet gear 38 can be envisioned as an instantaneous force vector that travels around the circumference of the planet gear as the ring gear rotates. The instantaneous force vector is illustrated in FIG. 3 at a point P on the planet gear circumference and represents the force transmitted by the ring gear to the planet gear at P, the point of contact. It should be understood that the pushing force that is transmitted from the ring gear to the planet gear through the point of contact P comprises a combination of a translational force and a rotational force. It also should be understood that when the ring gear 36 transmits its force at P, it imparts rotational motion to the planet gear 38, which in turn makes contact with the sun gear 40 at a point P', a point of engagement that walks around the sun gear.

More particularly, FIG. 3 shows that the planet gear 38 has an undulating inner wall surface 92 defined by a sequence of cycloid peaks and valleys. As shown in FIG. 3, the planet gear has thirteen peaks and thirteen valleys. FIG. 3 further shows that the sun gear outer surface 94 has a similar sequence of cycloid peaks and valleys, except that the sun gear 40 has one less set of cycloid peaks and valleys than the planet gear. Thus, the sun gear in FIG. 3 has twelve peaks and twelve valleys. Contact between the planet gear and sun gear occurs with a type of cycloid engagement such that only one or two sequences of peaks and valleys are actually in contact at any one time, as illustrated in FIG. 3. The point of cycloid engagement travels around the respective circumferences such that the point of engagement moves forward by one cycle of peaks and valleys for each revolution of the ring gear 36 in a manner that should be well understood by those skilled in the art without further explanation.

In FIG. 3, the center axis of rotation for the ring gear 36 is indicated by a point 96 at a location designated (0, 0) while the geometric center of the inner surface 84 of the ring gear is indicated by another point 98, offset from the first and designated (0,–0.024). The difference in coordinates indicates that, for the single-use camera illustrated, the offset of one axis from the other is approximately 0.024 inch (0.6 mm). It should be noted that the geometric center of the ring gear outer surface 80 also is the geometric center of the sun gear 40.

In manufacturing the components of the harmonic gear mechanism 32, it is important to obtain a smooth, continuous transmission of power from the ring gear 36 to the planet gear 38. Therefore, the planet gear can optionally be provided with three or more protrusions 100 that act as power transmission contact points where the ring gear transmits power to the planet gear. In this way, even if the outer circumference 86 of the planet gear is not sufficiently circular to ensure smooth, continuous contact with the ring gear, the protrusions provide a constant diameter circle having three (or more) points through which the ring gear can make contact with the planet gear and transmit its power. It should be understood that the illustrated protrusions are for purposes of manufacturing convenience only, permitting greater production tolerances for the molding of the planet gear, and are optional.

Figure 4:
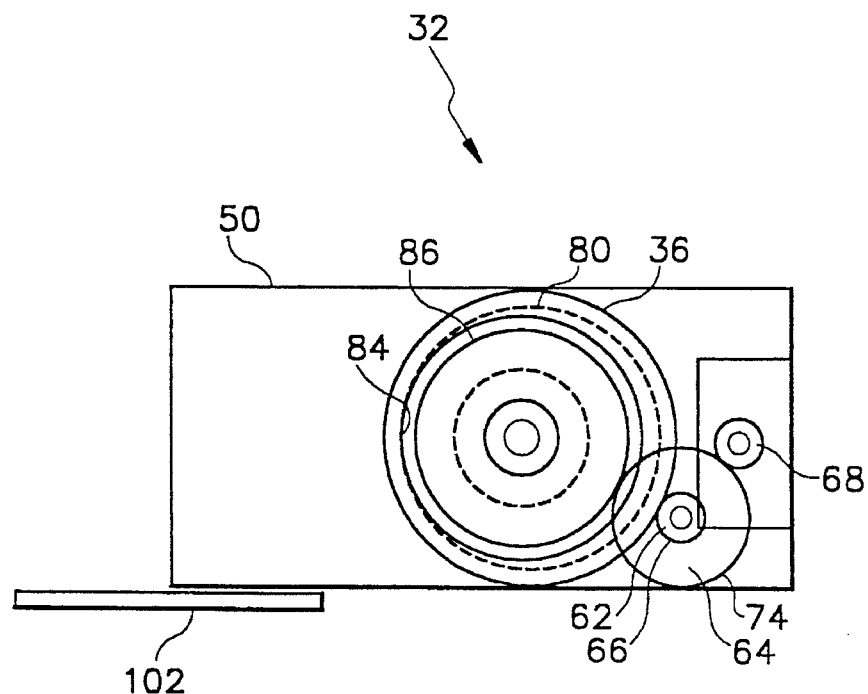
FIG. 4 is a side sectional view of the camera illustrated in FIG. 1 showing the autowind gear mechanism.

FIG. 4 is a plan view of the harmonic gear mechanism 32 looking down upon the gear plate 50 with the respective gear interfaces represented as nested circles. Thus, the motor output pinion drive gear 68 is represented as a circle located adjacent to another circle that represents the teeth 74 of the cluster gear upper flange 64. A circle located within the upper flange teeth circle 74 represents the teeth 66 of the cluster gear drive shaft 62. This circle is shown in FIG. 4 in tangential contact with a large diameter circle that represents the gear teeth 54 of the ring gear upper flange 52. Moving to the next inward circle of FIG. 4, the smooth lower circular face 80 of the ring gear is represented as a dashed circular line. The next line represents the ring gear inner surface 84, whose offset from the ring gear center is clearly illustrated. Compare, for example, the spacing between the ring gear lower circular face 80 and the ring gear inner surface 84 at opposite locations of the respective circles in FIG. 4. The next circle represents the outer surface 86 of the planet gear 38, which makes contact with the ring gear as described above. The innermost dashed circle represents the undulating inner surface 92 of the planet gear. Finally, FIG. 4 shows a film backing plate 102 of the camera relative to the harmonic gear mechanism 32.

Figure 5:
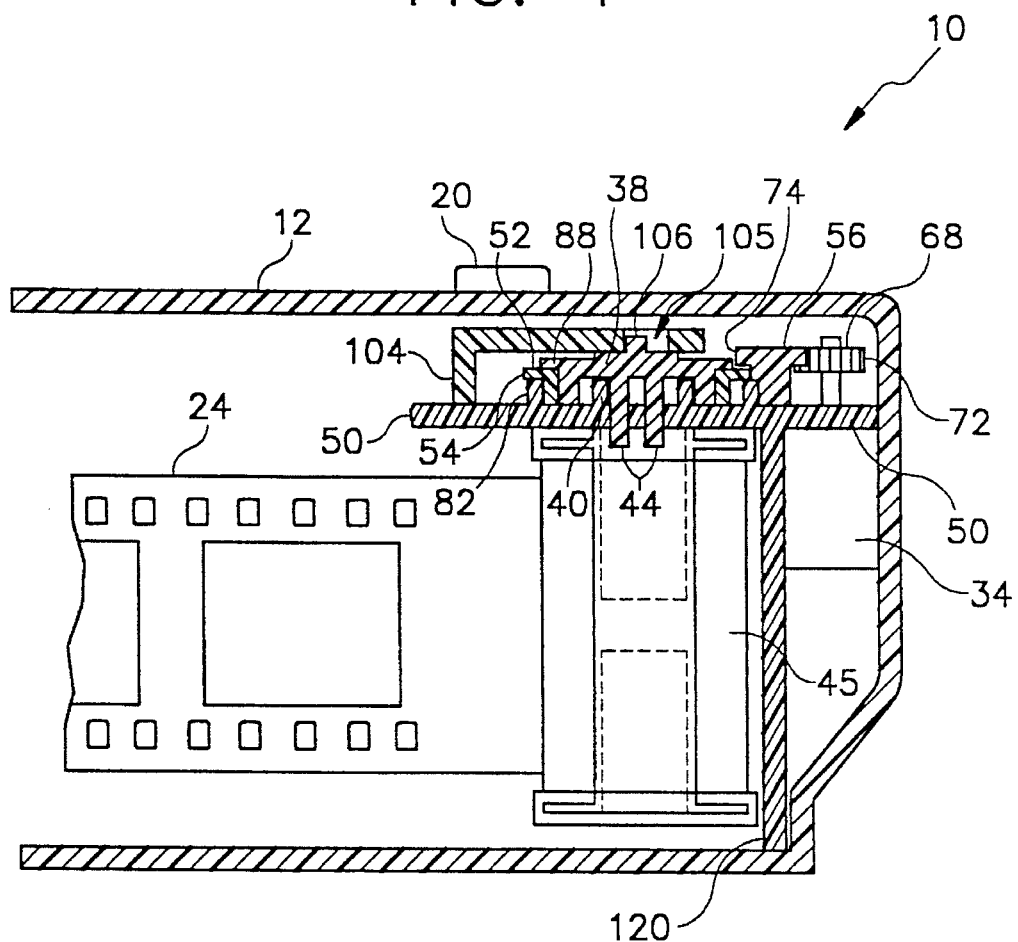
FIG. 5 is a plan sectional view of the camera illustrated in FIG. 1 showing the autowind gear mechanism.

FIG. 5 is a side sectional view of the camera 10 showing the harmonic gear mechanism 32 with a film cartridge 45 in the camera with a frame of the film 42 located adjacent the exposure gate 26 of the camera. FIG. 5 illustrates how the cluster gear 56 links the output of the film drive motor 34 to the ring gear 36 without the need for either a large drive pinion gear or a larger interface ring gear. Thus, a smaller motor can be used to drive the gear mechanism, permitting small camera size to be achieved. FIG. 5 also illustrates that the coupling tangs 44 of the planet gear 38 are offset from the center of the guide rib 82 but, as described above, will rotate within the keyed film spool. The film cartridge 45 that carries the film spool is shown in a film well 120 of the camera 10. Therefore, the coupling tangs will permit the planet gear its eccentric motion but will drive the film spool in a substantially circular motion through the keyed spool.

FIG. 5 shows that the ring gear 36 is supported by the raised outer wall 82, because the ring gear outer flange 52 rests on the top of the outer wall. FIG. 5 also shows that the planet gear 38 is supported by the ring gear, because the planet gear outer rim 88 rests on the top of the ring gear outer flange 52. Finally, FIG. 5 shows that a top plate 104 can be provided on the gear plate 50 with a planet gear opening 105 that receives a raised button 106 on the planet gear top 92 and serves to locate the planet gear as the planet gear goes through its eccentric motion.

The gear mechanism described above is designed specifically for application in a single use camera. Therefore, there is no provision for rewinding the film. Those skilled in the art, however, will recognize that provision can be made for rewinding the film, such as providing a clutch release mechanism to permit rotation of the gear train in a reverse direction. Those skilled in the art also will recognize that the eccentric ring gear of the illustrated embodiment can be replaced with a central eccentric gear that drives an outer planet gear. Because of considerations in terms of motor placement, however, in the preferred embodiment the eccentric gear is a ring gear that drives an inner planet gear. Thus, it is advantageous to direct the drive motor power over the fixed wall of the guide rib 82 and bring the power to the inner planet gear.

The present invention has been described above in terms of a presently preferred embodiment so that an understanding of the present invention can be conveyed. There are, however, many configurations for harmonic gear reduction mechanisms not specifically described herein, but with which the present invention is applicable. The present invention should therefore not be seen as limited to the particular embodiment described herein, but rather, it should be understood that the present invention has wide applicability with respect to harmonic gear reduction mechanisms generally. All modification, variations, or equivalent arrangements that are within the scope of the attached claims therefore should be considered within the scope of the invention.

The following elements and their corresponding reference numerals are used in the drawings:
single-use camera 10
camera housing/body 12
objective lens 14
camera front surface 16
viewfinder 18
shutter button 20
camera body top surface 22
photographic film roll 24
exposure gate 26
autowind film winding gear mechanism 30
harmonic gear reducer 32 film drive motor 34
ring gear 36
planet gear 38
sun gear 40
film spool 42
drive tangs 44
film cartridge 45
gear plate 50
ring gear upper flange 52
ring gear upper flange teeth 54
cluster gear 56
rotation pin 58
gear plate top surface 60
cluster gear drive shaft 62
cluster gear upper flange 64
cluster gear drive shaft teeth 66
film drive motor output pinion drive gear 68
gear plate opening 70
motor pinion drive gear teeth 72
cluster gear upper flange teeth 74
ring gear outer face 80
guide rib 82
ring gear inner surface 84
planet gear outer face 86
planet gear upper flange 88
top cap surface 90
planet gear inner wall 92
sun gear outer surface 94
ring gear axis of rotation 96
ring gear inner surface geometric center 98
planet gear protrusions 100
film backing plate 102
top plate 104
planet gear opening 105
planet gear button 106
film well 120

I claim:

1. A film winding gear mechanism for use in a camera having a camera housing that receives a roll strip of photographic film on which a series of exposures are produced and which are moved in the camera housing by operation of a film drive motor, the gear mechanism comprising:

an interface gear in meshing engagement with the film drive motor such that operation of the film drive motor causes the interface gear to rotate about a rotational axis;

a planet gear that is coupled to the roll strip of photographic film and is driven into eccentric motion by rotation of the interface gear; and a fixed sun gear in meshing engagement with the planet gear such that the movement of the planet gear causes the planet gear to revolve about the sun gear and thereby move the roll strip of film.

2. A gear mechanism as defined in claim 1, wherein the planet gear includes engagement tangs that are coupled to a film spool that is attached to one end of the roll strip of photographic film.

3. A gear mechanism as defined in claim 1, wherein the interface gear has a toothed circular outer circumference that engages a toothed output gear of the film drive motor and an offset inner circumference in driving contact with the planet gear.

4. A gear mechanism as defined in claim 3, wherein:

the offset inner circumference of the interface gear has a substantially smooth surface; and the outer circumference of the planet gear has a substantially smooth surface and is in driving contact with the interface gear inner circumference.

5. A gear mechanism as defined in claim 1, wherein the sun gear comprises a raised curved wall of the camera housing.

6. A gear mechanism as defined in claim 1, wherein:

the sun gear comprises a raised curved wall of the camera housing having a cycloid outer circumference including a plurality of cycloid peaks;

the planet gear comprises a gear having a cycloid inner circumference including a plurality of cycloid peaks that engage the outer circumference of the sun gear and a substantially smooth circular outer circumference; and the interface gear comprises a ring gear having a substantially smooth offset inner circumference in driving contact with the outer circumference of the planet gear and a toothed outer circumference.

7. A gear mechanism as defined in claim 6, wherein the cycloid outer circumference of the sun gear has a number of cycloid peaks different from the number of cycloid peaks of the planet gear inner circumference.

8. A gear mechanism as defined in claim 6, further comprising:

a cluster gear comprising a first toothed outer circumference in direct meshing engagement with a toothed output gear of the film drive motor and a second toothed outer circumference, axially displaced from the first toothed outer circumference, in direct meshing engagement with the toothed outer circumference of the interface gear.

9. A gear mechanism as defined in claim 6, wherein the interface gear further includes an outwardly extending flange that rests on a top surface of the sun gear.

10. A gear mechanism as defined in claim 9, wherein the planet gear includes an outwardly extending flange that rests on a top surface of the interface gear flange.

11. A gear mechanism comprising:

a fixed sun gear comprising a raised wall of a camera housing that receives a roll strip of photographic film on which a series of exposures is produced, the sun gear having a cycloid outer circumference including a plurality of cycloid peaks and valleys;

a planet gear having a cycloid inner circumference including a plurality of cycloid peaks and valleys that engage the outer circumference of the sun gear and a substantially smooth inner circumference, further having engagement tangs that are coupled to a film spool that is attached to one end of a roll strip of photographic film in the camera housing; and an interface gear comprising a ring gear having a substantially smooth eccentric inner circumference in driving contact with the outer circumference of the planet gear and a toothed outer circumference in meshing engagement with a film drive motor such that operation of the film drive motor causes the interface gear to rotate about a rotational axis, which thereby drives the planet gear such that the planet gear revolves eccentrically about the outer circumference of the sun gear and thereby moves the roll strip of photographic film.

12. A gear mechanism as defined in claim 11, wherein the cycloid outer circumference of the sun gear has a number of cycloid peaks different from the number of cycloid peaks of the planet gear inner circumference.

13. A gear mechanism as defined in claim 11, further comprising:

a cluster gear comprising a first toothed outer circumference in direct meshing engagement with a toothed output gear of the film drive motor and a second toothed outer circumference, axially displaced from the first toothed outer circumference, in direct meshing engagement with the toothed outer circumference of the interface gear.

14. A gear mechanism as defined in claim 11, wherein the interface gear further includes an outwardly extending flange that rests on a top surface of the raised internal wall sun gear.

15. A gear mechanism as defined in claim 14, wherein the planet gear includes an outwardly extending flange that rests on a top surface of the interface gear flange.

16. A photographic camera comprising:

a camera housing that receives a roll strip of photographic film on which a series of exposures is produced;

a film drive motor that operates to rotate an output gear;

an autowind gear mechanism that is driven by the output gear and is coupled to the roll strip of photographic film such that the roll strip of photographic film is moved within the housing when the film drive motor is operated, the autowind gear mechanism comprising:

an interface gear in meshing engagement with the film drive motor output gear such that operation of the film drive motor causes the interface gear to rotate about a rotational axis, a planet gear that is coupled to the roll strip of photographic film and is rotated by rotation of the interface gear, and a fixed sun gear in meshing engagement with the planet gear such that rotation of the planet gear causes the planet gear to revolve about the sun gear in an eccentric motion and thereby move the roll strip of film.

17. A photographic camera as defined in claim 16, wherein the planet gear includes engagement tangs that are coupled to a film spool that is attached to one end of the roll strip of photographic film.

18. A photographic camera as defined in claim 16, wherein the interface gear has a toothed circular outer circumference that engages a toothed output gear of the film drive motor and an eccentric inner circumference in driving contact with the planet gear.

19. A photographic camera as defined in claim 18, wherein:

the eccentric inner circumference of the interface gear has a substantially smooth surface; and the outer circumference of the planet gear is substantially smooth and is in driving contact with the interface gear inner circumference.

20. A photographic camera as defined in claim 16, wherein the sun gear comprises a raised internal wall of the camera housing.

21. A photographic camera as defined in claim 16, wherein:

the sun gear comprises a raised internal wall of the camera housing having a cycloid outer circumference including a plurality of cycloid peaks;

the planet gear comprises a gear having a cycloid inner circumference including a plurality of cycloid peaks that engage the outer circumference of the sun gear and a substantially smooth circular outer circumference; and the interface gear comprises a ring gear having a substantially smooth eccentric inner circumference in driving contact with the other circumference of the planet gear and a toothed outer circumference.

22. A photographic camera as defined in claim 21, wherein the cycloid outer circumference of the sun gear has a number of cycloid peaks different from the number of cycloid peaks of the planet gear inner circumference.

23. A photographic camera as defined in claim 21, further comprising:

a cluster gear comprising a first toothed outer circumference in direct meshing engagement with a toothed output gear of the film drive motor and a second toothed outer circumference, axially displaced from the first toothed outer circumference, in direct meshing engagement with the toothed outer circumference of the interface gear.

24. A photographic camera as defined in claim 21, wherein the interface gear further includes an outwardly extending flange that rests on a top surface of the raised internal wall sun gear.

25. A photographic camera as defined in claim 24, wherein the planet gear includes an outwardly extending flange that rests on a top surface of the interface gear flange.

26. A photographic combination comprising:

a camera including a housing;

a roll strip of photographic film, contained within the camera housing, on which a series of exposures is produced; and an autowind gear mechanism comprising:

a film drive motor that operates to rotate a motor output gear;

a fixed sun gear comprising a raised internal wall of the camera housing having a cycloid outer circumference including a plurality of cycloid peaks, a planet gear having a cycloid inner circumference including a plurality of cycloid peaks that engage the outer circumference of the sun gear and a substantially smooth inner circumference, further having engagement tangs that drive a film spool that is attached to one end of the roll strip of photographic film, and an interface gear comprising a ring gear having a substantially smooth eccentric inner circumference in driving contact with the outer circumference of the planet gear and a toothed outer circumference in meshing engagement with the film drive motor output gear such that operation of the film drive motor causes the interface gear to rotate about a rotational axis, which drives the planet gear such that the planet gear revolves eccentrically about the outer circumference of the sun gear and thereby move the roll strip of film.

27. A photographic combination as defined in claim 26, wherein the autowind gear mechanism is contained within the camera housing.

28. A photographic combination as defined in claim 26, wherein the cycloid outer circumference of the sun gear has a number of cycloid peaks different from the number of cycloid peaks of the planet gear inner circumference.

29. A photographic combination as defined in claim 26, further comprising:

a cluster gear comprising a first toothed outer circumference in direct meshing engagement with a toothed output gear of the film drive motor and a second toothed outer circumference, axially displaced from the first toothed outer circumference, in direct meshing engagement with the toothed outer circumference of the interface gear.

30. A photographic combination as defined in claim 26, wherein the interface gear further includes an outwardly extending flange that rests on a top surface of the raised internal wall sun gear.

31. A photographic combination as defined in claim 30, wherein the planet gear includes an outwardly extending flange that rests on a top surface of the interface gear flange.

* * * * *

UNITED STATES PATENT AND TRADEMARK OFFICE
CERTIFICATE OF CORRECTION

PATENT NO. : 5,530,502
DATED : June 25, 1996
INVENTOR(S) : Dwight J. Petruchik

It is certified that error appears in the above-indentified patent and that said Letters Patent is hereby corrected as shown below:

Column 9, Line 60..delete "other" and insert---outer---.

Signed and Sealed this

Third Day of December, 1996

Attest:

BRUCE LEHMAN

*Attesting Officer*  *Commissioner of Patents and Trademarks*